US007010334B2

(12) United States Patent  (10) Patent No.: US 7,010,334 B2
Saito  (45) Date of Patent: Mar. 7, 2006

(54) FOLDING PORTABLE RADIO COMMUNICATION DEVICE

(75) Inventor: Tetsuya Saito, Saitama (JP)

(73) Assignee: NEC Corporation, Tokyo (JP)

( * ) Notice: Subject to any disclaimer, the term of this patent is extended or adjusted under 35 U.S.C. 154(b) by 404 days.

(21) Appl. No.: 10/226,121

(22) Filed: Aug. 23, 2002

(65) Prior Publication Data
US 2003/0040338 A1  Feb. 27, 2003

(30) Foreign Application Priority Data
Aug. 23, 2001  (JP) .............................. 2001-252280

(51) Int. Cl.
*H04M 1/00* (2006.01)
(52) U.S. Cl. .............................. 455/575.7; 455/575.3; 455/575.1; 455/550.1; 455/90.3; 343/702
(58) Field of Classification Search ............ 455/575.3, 455/575.7, 575.1, 562.1, 550.1; 343/702; 379/433.13
See application file for complete search history.

(56) References Cited

U.S. PATENT DOCUMENTS

| | | | |
|---|---|---|---|
| 5,337,061 A * | 8/1994 | Pye et al. .................... 343/702 |
| 5,451,965 A * | 9/1995 | Matsumoto ................. 343/702 |
| 5,508,709 A * | 4/1996 | Krenz et al. ................ 343/702 |
| 5,530,919 A * | 6/1996 | Tsuru et al. ............. 455/575.5 |
| 5,542,106 A * | 7/1996 | Krenz et al. ............ 455/575.7 |
| 5,572,223 A * | 11/1996 | Phillips et al. ............. 343/702 |
| 6,011,519 A * | 1/2000 | Sadler et al. ............... 343/742 |
| 6,097,339 A * | 8/2000 | Filipovic et al. ............ 343/702 |
| 6,137,445 A * | 10/2000 | Ha et al. .................... 343/702 |
| 6,266,538 B1 * | 7/2001 | Waldron .................. 455/575.7 |
| 6,336,037 B1 * | 1/2002 | Sekine et al. ............ 455/550.1 |
| 6,423,915 B1 * | 7/2002 | Winter ....................... 200/292 |
| 6,442,399 B1 * | 8/2002 | Tsuru et al. ............. 455/575.7 |
| 6,442,400 B1 * | 8/2002 | Ying et al. ............... 455/552.1 |
| 6,470,175 B1 * | 10/2002 | Park et al. ................. 455/90.1 |
| 6,600,450 B1 * | 7/2003 | Efanov et al. ............. 343/726 |
| 6,681,125 B1 * | 1/2004 | Woo ....................... 455/556.1 |
| 2002/0142794 A1 * | 10/2002 | Harano ....................... 455/550 |
| 2003/0013490 A1 * | 1/2003 | Shoji et al. ................. 455/562 |

FOREIGN PATENT DOCUMENTS

| | | |
|---|---|---|
| EP | 0 854 535 A2 | 7/1998 |
| EP | 1 211 749 A1 | 6/2002 |
| EP | 1 271 687 A1 | 1/2003 |
| GB | 2 361 138 | 10/2001 |
| JP | 1-198121 | 8/1989 |
| JP | 5-327527 | 12/1993 |

(Continued)

OTHER PUBLICATIONS

Japanees Office Action dated Feb. 10, 2004 with English translation of pertinent portions.

(Continued)

*Primary Examiner*—William Trost
*Assistant Examiner*—Sharad Rampuria
(74) *Attorney, Agent, or Firm*—Whitham, Curtis & Christofferson, PC

(57) ABSTRACT

A folding portable radio communication device has a plurality of bodies, one or more hinges for connecting the plurality of bodies so as to be mutually swingable. A first body in the plurality of bodies houses therein a microphone and a circuit board and, further, mounts therein an antenna part without the projection of the antenna part from the first body.

11 Claims, 11 Drawing Sheets

FOREIGN PATENT DOCUMENTS

| | | |
|---|---|---|
| JP | 6-112880 | 4/1994 |
| JP | 7-79110 | 3/1995 |
| JP | 9-64778 | 3/1997 |
| JP | 9-135108 | 5/1997 |
| JP | 11-177485 | 7/1999 |
| JP | 11-331017 | 11/1999 |
| JP | 2002-246935 | 8/2002 |

OTHER PUBLICATIONS

Japanese Office Action dated Nov. 26, 2003 with English translation of pertinent portions.
British Search Report dated Jul. 16, 2001.
Chinese Office Action dated Nov. 14, 2003.
English translation of Chinese Office Action.

* cited by examiner

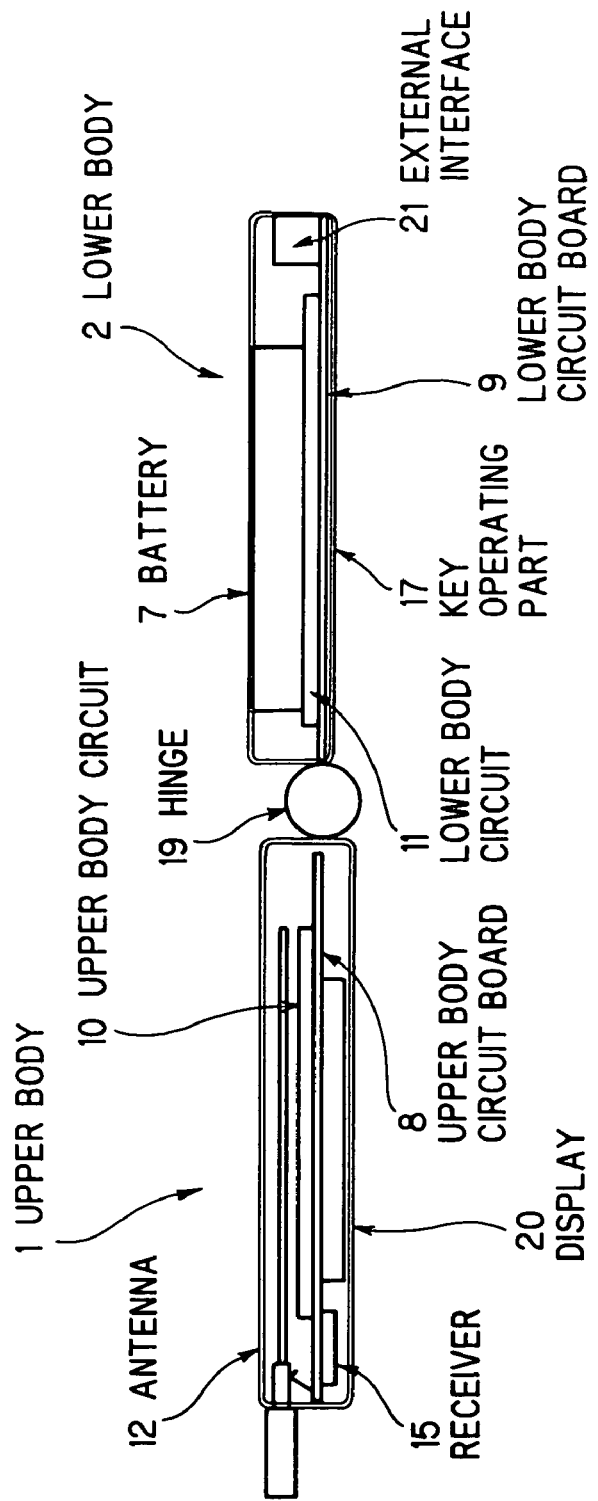
FIG. 3A PRIOR ART
FIG. 3B PRIOR ART

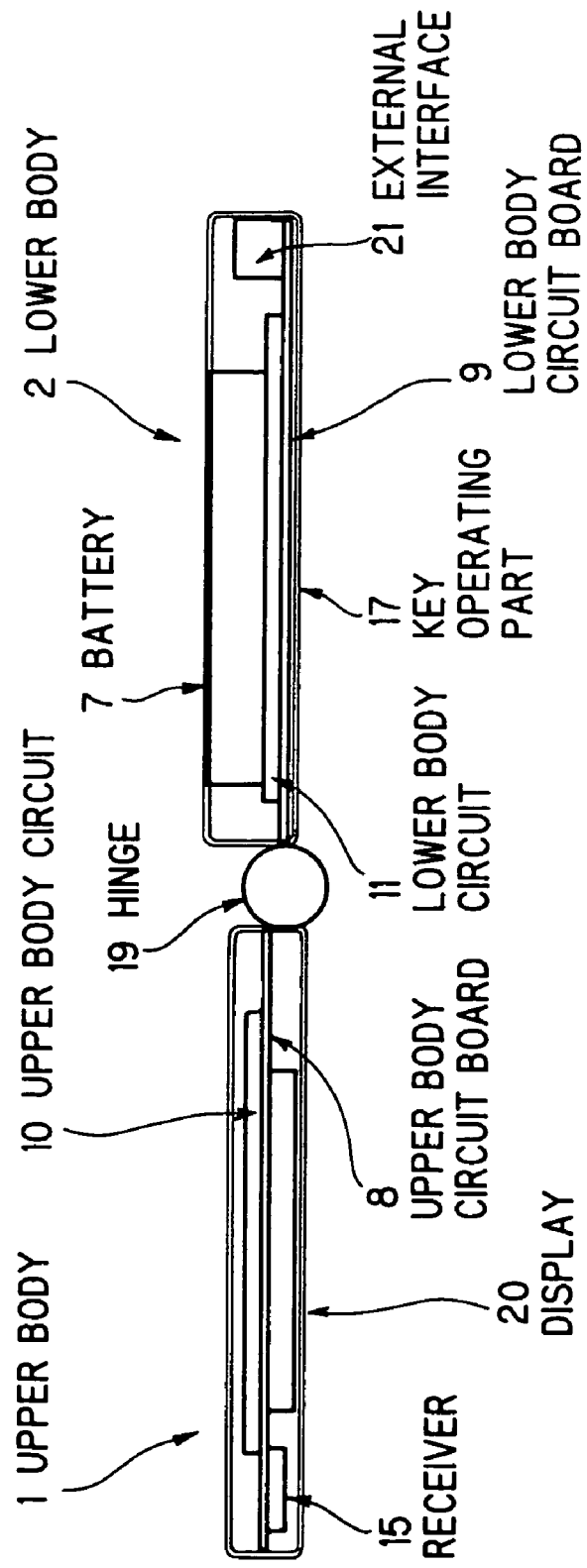

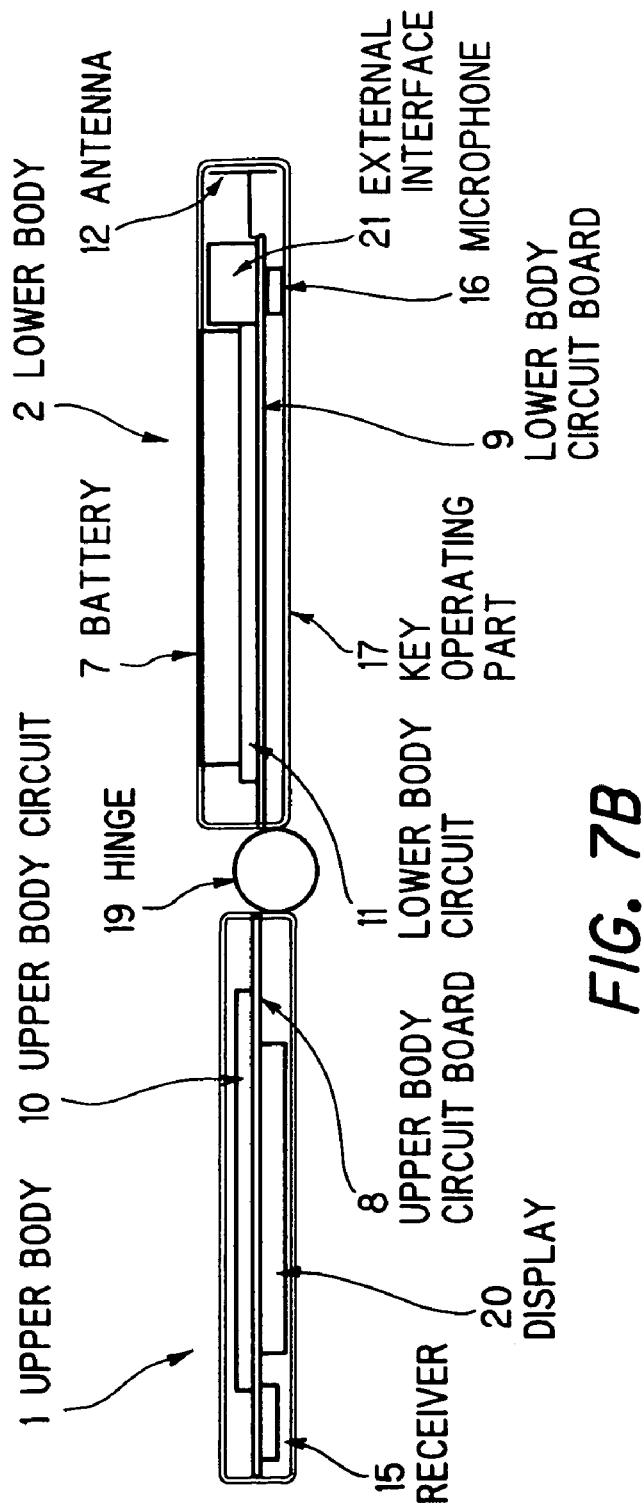
FIG. 7A
FIG. 7B

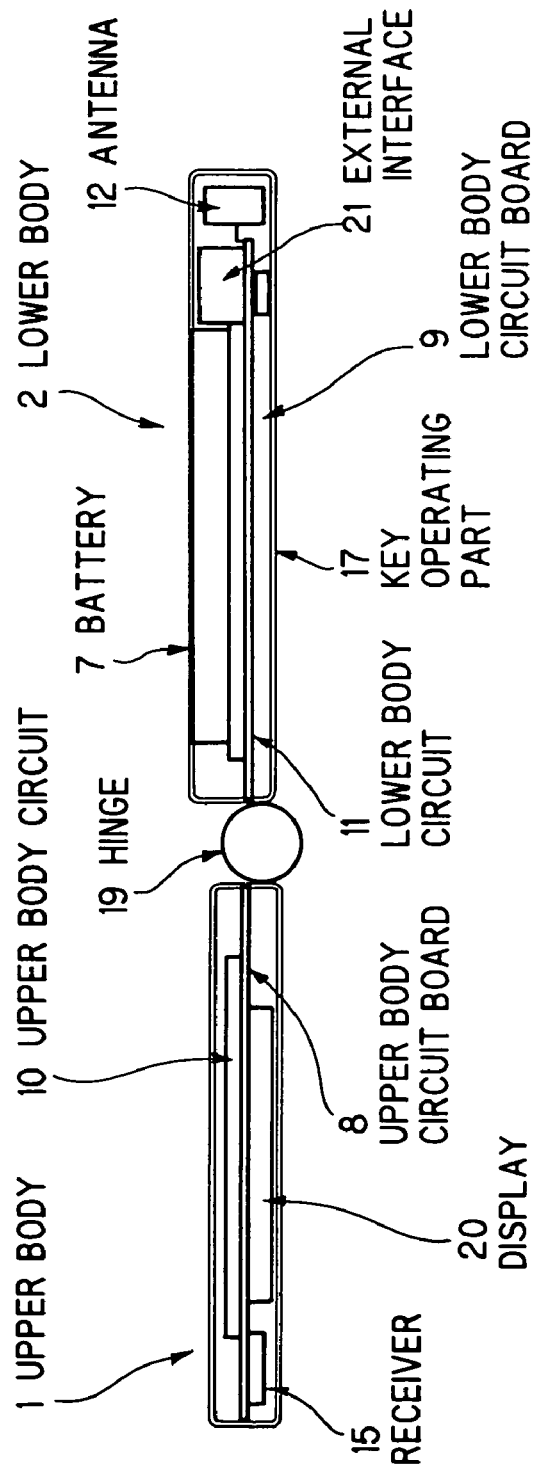
FIG. 11A
FIG. 11B

FOLDING PORTABLE RADIO COMMUNICATION DEVICE

FIELD OF THE INVENTION

The invention relates to a folding portable ratio communication device comprising an upper body and a lower body which have been provided swingably through a hinge, and more particularly to a folding portable radio communication device comprising an antenna built in a lower body.

BACKGROUND OF THE INVENTION

The development of mobile communication technology in recent years has led to rapid spread of portable radio communication devices. Under these circumstances, in order to meet various needs of users, manufacturers of portable radio communication devices have brought portable radio communication devices having a wide variety of forms to market.

In particular, recently, a technique for realizing connection to the Internet and the like through potable radio communication devices has been developed, and this has led to a user's strong demand for an increase in monitor size. In order to meet this demand, a folding portable radio communication device has been proposed which comprises a body divided into an upper body and a lower body which have been linked to each other through a connection called "hinge", so as to be mutually swingable.

This folding portable radio communication device can ensure a large area of an operating part as an interface with users and a large area of a display for supplying letters or other information to users and, in addition, when it is not in use, can be folded to save the space. Further, a design is possible wherein, when the body is unfolded in use, the spacing between a microphone and a receiver is close to the spacing between an ear and a mouth of a human. This can advantageously realize the provision of good communication quality at the time of calling. Therefore, this type of portable radio communication devices have ensured a great demand as a device which can satisfactorily meet the above needs.

In order to display a larger amount of information obtained through the Internet, there is an ever-increasing tendency toward an increase in size of a liquid crystal display (LCD) screen constituting the display and a change from a black-and-white screen to a color screen. In this case, however, regarding the portable radio communication device per se, there is a tendency toward a reduction in thickness and a reduction in weight for carrying convenience.

In portable radio communication devices, an antenna for radio communication purposes should be provided. A whip antenna, which can be stretched and housed and thus is convenient for carrying, has been widely used. In use of the portable radio communication device, the whip antenna is stretched, while, when the portable radio communication device is in a standby state, the whip antenna is housed within the portable radio communication device. In this case, since communication with a base station is often carried out even in the standby state, even when the antenna is in the housed state, the front portion of the antenna is in the state of projection from the portable radio communication device.

The constitution of an example of this type of folding portable radio communication device is shown in FIG. 1.

The conventional folding portable radio communication device shown in FIG. 1 comprises an upper body 1 and a lower body 2. The upper body 1 comprises a front part 3 of the upper body and a back part 4 of the upper body which have an identical size and have been put on top of each other. The lower body 2 comprises a front part 5 of the lower body and a back part 6 of the lower body which have an identical size and have been put on top of each other. An antenna part 12 comprised of a whip antenna is disposed, at an upper end of the back part 4 of the upper body 1, in the state of projection from the upper body 1. The antenna part 12 can be further stretched toward the outside of the upper body 1 and, in addition, can be housed within the upper body 1. An antenna housing part 24 is provided, within the upper body 1, as a space for allowing the antenna part 12 to be retracted into the upper body 1.

An upper body circuit board 8, an upper body circuit 10, a receiver 15, a display 20, and a power supply terminal 13 for supplying electric power to the antenna part 12 are housed within the upper body 1.

Further, a battery 7, a lower body circuit board 9, a lower body circuit 11, a microphone 16, a key operating part 17, and an external interface 21 are housed within the lower body 2.

The upper body 1 and the lower body 2 are connected to each other through a hinge 19 so that they are mutually swingable and can be folded and unfolded. FIG. 1 is a diagram showing the unfolded state of the upper body 1 and the lower body 2.

In this folding portable radio communication device, the battery 7 is disposed in the lower body 2 from the viewpoints of weight balance at the time of holding of the folding portable radio communication device and stability when the folding portable radio communication device is placed on a desk.

The lower body circuit 11 including a transmitter (not shown) having the largest power consumption is preferably provided at a position close to the battery 7 from the viewpoint of reducing the voltage drop in each power supply pattern. For this reason, the lower body circuit 11 is disposed within the lower body 2. Further, the provision of the lower body circuit 11 within the lower body 2 is also convenient from the viewpoint of a reduction in thickness of the folding portable radio communication device.

The upper body circuit board 8 and the lower body circuit board 9 are electrically connected to each other through a connection 18, having a predetermined conductor pattern between the upper and lower circuits. Signals are transmitted and received through the connection 18 between the upper and lower circuits. The battery 7 is connected to the lower body circuit board 9 and functions to supply electric power to each component part through the lower body circuit board 9.

The connection 18 between the upper and lower circuits is in many cases constituted, for example, by a flexible printed board. The flexible printed board is used for avoiding the breakage of the connection 18 between the upper and lower circuits as the conductor upon swinging of the upper body 1 and the lower body 2 in the hinge 19.

In the conventional folding portable radio communication device shown in FIG. 1, the front part 3 of the upper body and the front part 5 of the lower body are formed of a metal from the viewpoint of ensuring strength.

On the other hand, the antenna part 12 is disposed at the back part 4 of the upper body and is in contact with and connected to a power supply terminal 13 provided in the upper body circuit 10. Further, this power supply terminal 13 is connected to a coaxial cable 25. The coaxial cable 25 is extended from the power supply terminal 13 through the hinge 19 and is connected to the lower body circuit 11. This permits transmission/reception between the power supply terminal 13 and the lower body circuit 11 through the coaxial cable 25. This coaxial cable 25 is fixed to a predetermined position by a cable brace not shown.

FIG. 2 is a front view of the folding portable radio communication device shown in FIG. 1, FIG. 3 a cross-sectional view taken on line A—A of FIG. 2, and FIG. 4 a cross-sectional view taken an line B—B of FIG. 2. FIGS. 3A and 4A each are a cross-sectional view of the folding portable radio communication device in an unfolded state, and FIGS. 3B and 4B each are a cross-sectional view of the folding portable radio communication device in a folded state.

In the conventional folding portable radio communication device, since the antenna part 12 is disposed in the upper body 1, an antenna housing part 24 should be provided, within the upper body 1, as a space for housing the antenna part 12 in the upper body 1. For this reason, in the folding portable radio communication device having this structure, reducing the thickness of the body in the folded state causes the antenna part 12 to be relatively projected from the back part 4 of the upper body.

As a result, although a significant reduction in size of the antenna cannot be realized, a reduction in size and a reduction in weight of portable radio communication devices have been made and, in addition, the size of the display 20 has been increased. Due to this construction, when the antenna part 12 is housed, the antenna housing part 24 is further projected from the back part 4 of the upper body. This is an obstacle to a reduction in size and, at the same time deteriorates the appearance and reduces the degree of freedom in design.

For example, a folding portable radio communication device, wherein an antenna part 12 has been mounted on the lower body 2 side as shown in FIG. 5, is considered effective for reducing the above problem.

Since, however, actual voice speech is carried out in such a state that the lower body 2 is held by the hand, when the antenna part 12 is mounted in the lower body 2 as shown in FIG. 5, the user's hand touches the antenna part 12. This disadvantageously deteriorates the characteristics of the antenna in the antenna part 12.

Further, there is no difference in the level of projection of the antenna part 12 in the housed state between when the antenna part 12 is mounted in the upper body 1 and when the antenna part 12 is mounted in the lower body 2. This poses a problem that, for example, when the user takes the folding portable radio communication device out of a pocket or the like, the antenna part 12 is caught.

Further, since the antenna part 12 comprising a whip antenna is projected from the upper body 1 or the lower body 2, when the portable radio communication device has been accidentally dropped from the whip antenna side, an impact is applied to the whip antenna, disadvantageously often leading to the breakage of the antenna part 12.

Further, in the structure of the conventional folding portable radio communication device shown in FIG. 1, a coaxial cable 25 should be provided for connecting the antenna part 12 to the lower body circuit 11. This poses a problem that the assembly efficiency in the production process is inferior to that in the case of non-folding portable radio communication devices.

SUMMARY OF THE INVENTION

In view of the above problems of the conventional folding portable radio communication devices, the invention has been made, and it is an object of the invention to provide a folding portable radio communication device which, unlike the prior art technique, provides no projection of the antenna part from the body and, at the same time, can reduce catching during carrying and the breakage of the antenna part upon dropping.

It is another object of the invention to provide a folding portable radio communication device having such a structure that, at the time or actual voice speech in which the user often holds a portion around the hinge by the hand, the hand of the user does not touch the antenna part.

It is a further object of the invention to provide a folding portable radio communication device which can eliminate the need to provide a coaxial cable for connecting the antenna part to the lower body circuit and can realize an improvement in assembly efficiency and a reduction in cost.

The above objects can be attained by the folding portable radio communication device of the invention which effectively utilizes the space within the body and houses the antenna part in the body, particularly within the lower body.

Specifically, according to the first feature of the invention, a folding portable radio communication device comprises a plurality of bodies, one or more hinges for connecting the plurality of bodies so an to be mutually swingable, wherein the first body in the plurality of bodies houses therein a microphone and a circuit board and, further, mounts therein an antenna part without the projection of the antenna part from the first body to the exterior.

Thus, according to the folding portable radio communication device of the invention, unlike the conventional folding portable radio communication device, the elimination of the projection of the antenna part from the body can enhance the degree of freedom in design, can further avoid catching at the time of taking out the portable radio communication device from a pocket or the like.

Further, in the folding portable radio communication device of the invention, the antenna part and the circuit board are mounted in an identical body. Therefore, unlike the prior art technique, the necessity of incorporating a coaxial cable for connecting the antenna part to the lower body circuit can be eliminated. This can contribute to improved assembly efficiency (productivity) and can realize effective utilization of the space within the body.

The provision of the antenna part without projection from the first body can prevent the antenna from being caught in the hand which holds the body at the time of calling. This can prevent a deterioration in antenna characteristics.

The antenna part can be built, for example, in the first body.

In this case, there is no possibility that the antenna part is projected from the body to the exterior. This can improve the degree of freedom in design, can prevent the antenna part from being caught in a pocket, and can prevent a deterioration in antenna characteristics of the antenna part caused by the touch of the user's hand with the antenna part.

The antenna part may be mounted, for example, in the first body in its end remote from the end of the first body to which the hinge is connected.

The antenna part may be disposed at any position within the first body. The disposition of the antenna part at the end of the first body remote from the hinge in the first body can effectively utilize the space within the first body, since the connection 18 between upper and lower circuits formed of, for example, a flexible printed board (see FIG. 1) is disposed at the end close to the hinge in the first body, the end close to the hinge in the first body does not have a sufficient space. Therefore, preferably, the antenna part is disposed at the end remote from the hinge.

The plurality of bodies constituting the folding portable radio communication device according to the invention may be constituted, for example, respectively by an upper body, which is located at the upper part when the folding portable radio communication device has been opened, and a lower body which is located at the lower part when the folding portable radio communication device has been opened. In this case, the lower body may be selected as the first body.

Specifically, the invention may be applied to any form of folding portable radio communication device so far as the folding portable radio communication device comprises a plurality of bodies. The folding portable radio communication device comprising an upper body and a lower body is a form which is currently widely used.

The antenna part may be disposed so as to be spread in a direction perpendicular to a direction in which the circuit board mounted within the first body is spread.

In the antenna part, for example, a plate antenna formed of a sheet metal may be used.

Thus, the formation of the antenna part in a plate form can realize housing of the antenna part within the first body without occupying a large space.

In the case of the use of a plate antenna as the antenna part, when the direction, in which the circuit board is spread, is different from the direction in which the antenna part is spread, the space within the first body can be more effectively utilized. In particular, when the angle of the direction, in which the circuit board is spread, to the direction, in which the antenna part is spread, is 90 degrees, the space within the first body can be most effectively utilized.

The first body may be constructed so that the first body is longer than the second body and, at the time of folding of the folding portable radio communication device, is projected beyond the second body.

For example, when the antenna part is disposed at the end of the first body and a construction is adopted wherein, at the time of folding of the folding portable radio communication device, the end is not covered with the second body, the influence of the second body on the antenna part can be prevented and a deterioration in antenna characteristics of the antenna part can be prevented.

The antenna part may be in any form and is not limited to the plate antenna. For example, the antenna part may comprise a linear antenna.

When the linear antenna is adopted, the antenna part can be disposed according to the space within the first body.

The linear antenna may be, for example, a meander line antenna, a Hula-Hoop antenna, or a helical antenna.

The first body may comprise, for example, a front part, which faces another body when the folding portable radio communication device has been folded, and a back part which is put on top of the front part to constitute the first body. In this case, the front part is preferably formed of an insulator. Alternatively, when the front part is formed of a metal, preferably, the front part is electrically insulated from the antenna part.

The above construction can prevent the influence of the metal constituting the body on the antenna part.

BRIEF DESCRIPTION OF THE DRAWING

The invention will be explained in more detail in conjunction with the appended drawings, wherein;

FIG. 3 is a cross-sectional view taken on line A—A of FIG. 1, wherein FIG. 3A is a cross-sectional view of the folding portable radio communication device in an unfolded state and FIG. 3B a cross-sectional view of the folding portable radio communication device in a folded state;

FIG. 4 is a cross-sectional view taken on line B—B of FIG. 1, therein FIG. 4A is a cross-sectional view of the folding portable radio communication device in an unfolded state and FIG. 4B a cross-sectional view of the folding portable radio communication device in a folded state;

FIG. 7 is a cross-sectional view of the folding portable radio communication device according to the first preferred embodiment of the invention shown in FIG. 6, wherein FIG. 7A is a cross-sectional view of the folding portable radio communication device in an unfolded state and FIG. 7B a cross-sectional view of the folding portable radio communication device in a folded state;

FIG. 11 is a cross-sectional view of the folding portable radio communication device according to the fourth preferred embodiment of the invention shown in FIG. 10, wherein FIG. 11A is a cross-sectional view of the folding portable radio communication device in an unfolded state and FIG. 11B a cross-sectional view of the folding portable radio communication device in a folded state.

DESCRIPTION OF THE PREFERRED EMBODIMENTS

Preferred embodiments of the invention will be explained in conjunction with the accompanying drawings.

Figure 6:
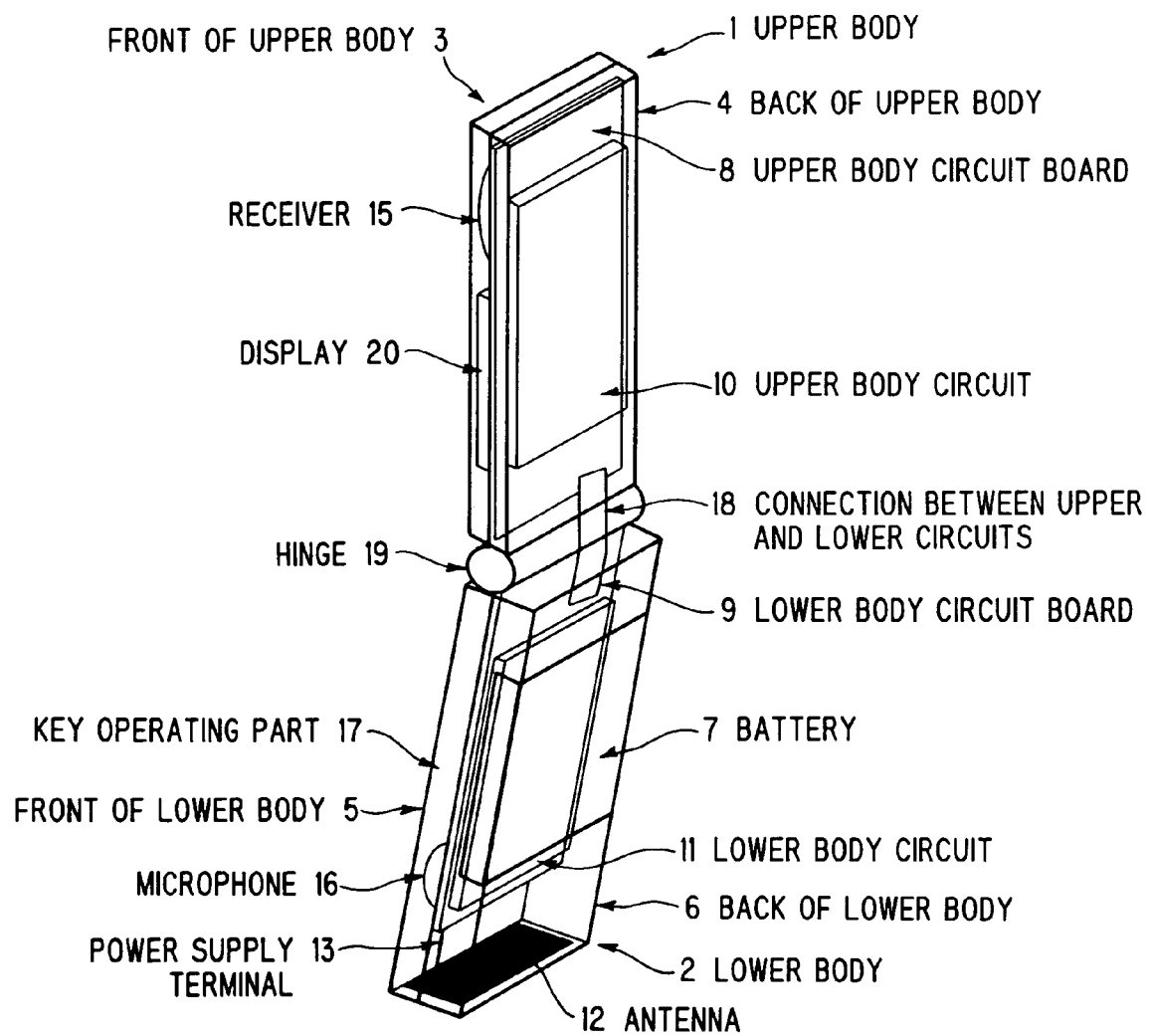
FIG. 6 is a perspective view showing the construction of a folding portable radio communication device according to a first preferred embodiment of the invention.

FIG. 6 is a perspective view showing the construction of a folding portable radio communication device according to a first preferred embodiment of the invention. FIG. 7A is a cross-sectional view of the folding portable radio communication device in an unfolded state according to this preferred embodiment, and FIG. 7B is a cross-sectional view of the folding portable radio communication device in a folded state according to this preferred embodiment.

In FIG. 6, the folding portable radio communication device according to this preferred embodiment comprises the upper body 1 and the lower body 2. The upper body 1 comprises a front part 3 of the upper body and a back part 4 of the upper body which have an identical size and have been put on top of each other. The lower body 2 comprises a front part 5 or the lower body and a back part 6 of the lower body which have an identical size and have been put on top of each other.

The upper body 1 and the lower body 2 are connected to each other through a hinge 19 so that they are mutually swingable and can be folded and unfolded. FIG. 6 is a diagram showing the unfolded state of the upper body 1 and the lower body 2.

An upper body circuit board 9, an upper body circuit 10, a receiver 15, and a display 20 are housed within the upper body 1.

A battery 7, a lower body circuit board 9, a lower body circuit 11, a power supply terminal 13, a microphone 16, a key operating part 17, and an antenna 22 are housed within the lower body 2.

An antenna 12 is mounted on a portion close to the microphone 16 at the end in the longitudinal direction of the lower body 2 remote from the hinge 19 through which the lower body 2 is connected to the upper body 1.

The key operating part 17 is exposed to the surface of the front part 5 or the lower body and functions as the interface between users and a control unit (not shown) disposed in the upper body circuit 10 and the lower body circuit 11.

On the other hand, the upper body circuit 10 housed in the upper body 1 is a circuit for controlling the circuits housed respectively in the upper body 1 and the lower body 2. The receiver 15 functions as a voice input/output interface with users. Further, the display 20 is exposed on the surface of the front part 3 of the upper body and functions to visually give letters, figures, and other various types of information to users.

The upper body circuit board 8 and the lower body circuit board 9 are connected to each other through a connection 18, between the upper and lower circuits, which extends through the hinge 19 and reaches both the upper body 1 and the lower body 2. In this preferred embodiment, this connection 18 between the upper and lower circuits is constituted by a flexible printed board, is deformed upon the deformation of the swingable hinge 19 (at the time of folding and unfolding), and is operated so as to maintain such a state that the upper body circuit board 8 and the lower body circuit board 9 are always in the state of being connected to each other. In this preferred embodiment, the connection 18 between the upper and lower circuits is in the form of a linear belt. Alternatively, the connection 18 between the upper and lower circuits may be in the form of bellows or a roll of several turns to impart stretching properties and thus to cope with the deformation of the hinge 19.

The battery 7 supplies electric power to the lower body circuit board 9 and supplies electric power to the lower body circuit 11 through the lower body circuit board 9. Further, the battery 7 supplies electric power from the lower body circuit board 9 through the connection 18 between the upper and lower circuits to the upper body circuit board 8 housed in the upper body 1, and electric power is supplied from the upper body circuit board 8 to the upper body circuit 10.

The lower body circuit 11 housed in the lower body 2 includes circuits necessary for transmission and reception of signals and executes diffusion modulation processing or other processing for information, to be transmitted, according to need.

In the folding portable radio communication device according to this preferred embodiment, since both the lower body circuit 11 and the battery 7 are housed in the lower body 2, the distance of a lead for connecting the battery 7 to the lower body circuit 11 can be made shorter than that in the prior art technique. By virtue of this, in addition to the above effect of simplifying the construction, i.e., improving assembly efficiency, an additional effect can be attained such that, even when a large current is allowed to flow into the lower body circuit 11 at the time of transmission, drop of voltage supplied to other circuit can be prevented.

In the folding portable radio communication device in this preferred embodiment, the antenna 12 is a plate antenna. The plate antenna 12 is disposed at a right angle to the lower body circuit board 9, is connected to the lower body circuit board 9 through a power supply terminal 13 for supplying electric power to the plate antenna, and is operated as an antenna.

Figure 1:
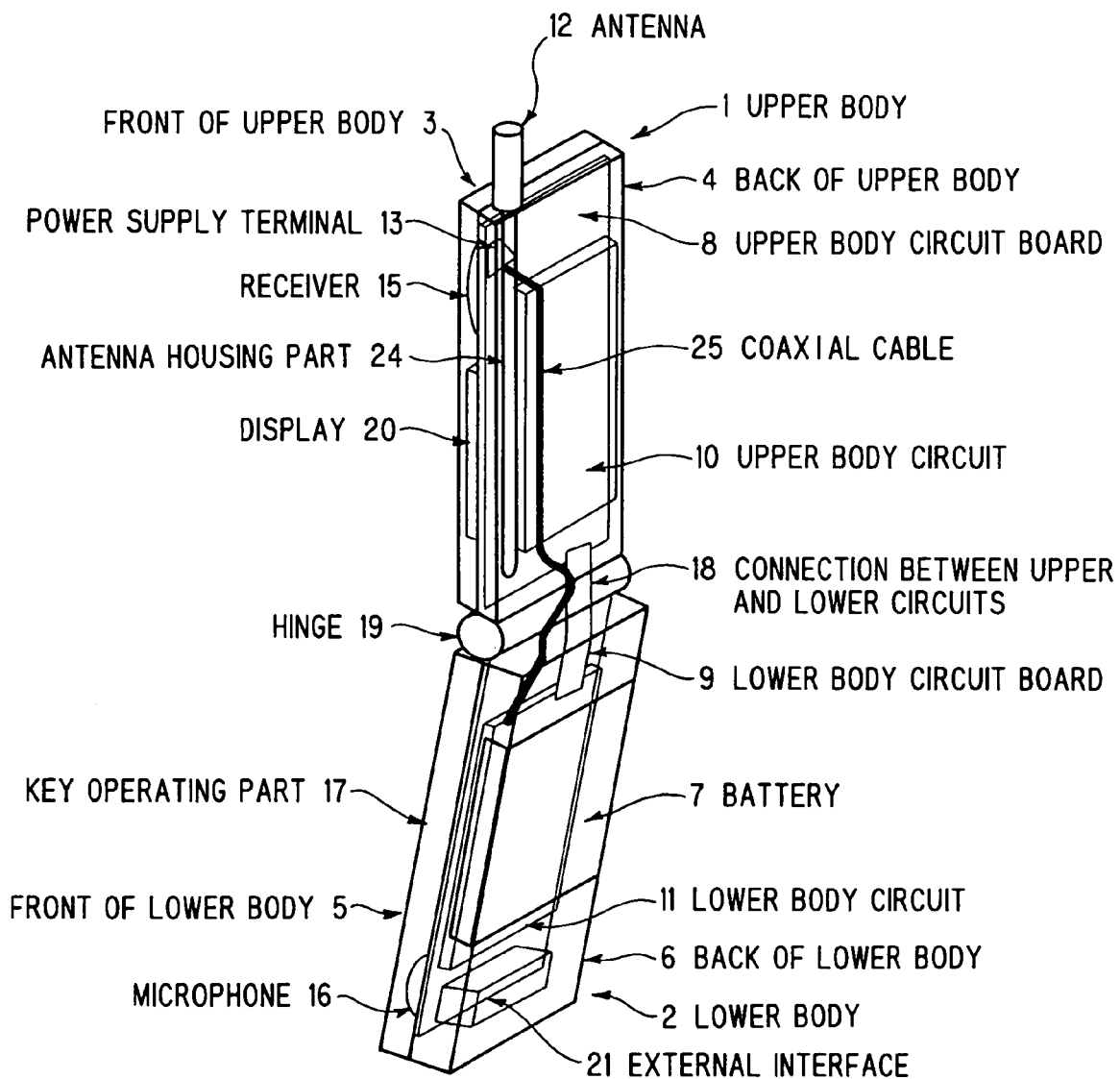
FIG. 1 is a perspective view showing the construction of a conventional folding portable radio communication device.
Figure 2:
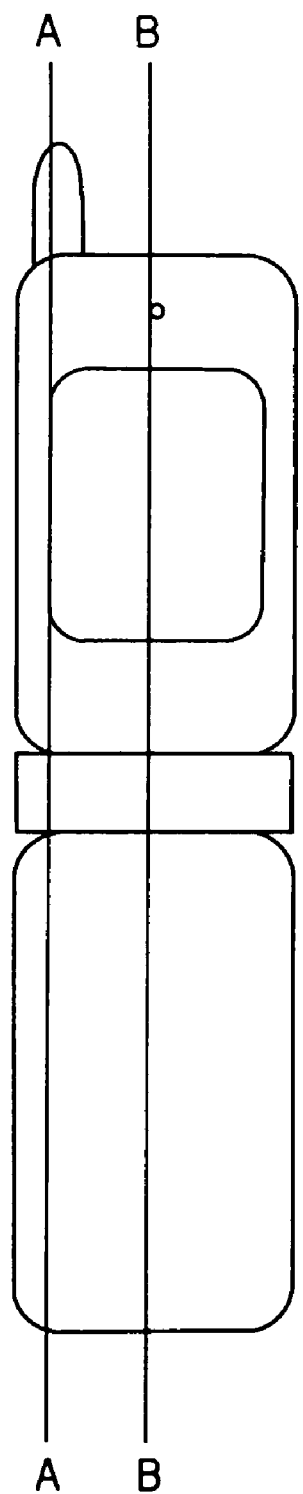
FIG. 2 is a front view of the folding portable radio communication device shown in FIG. 1.
Figure 5:
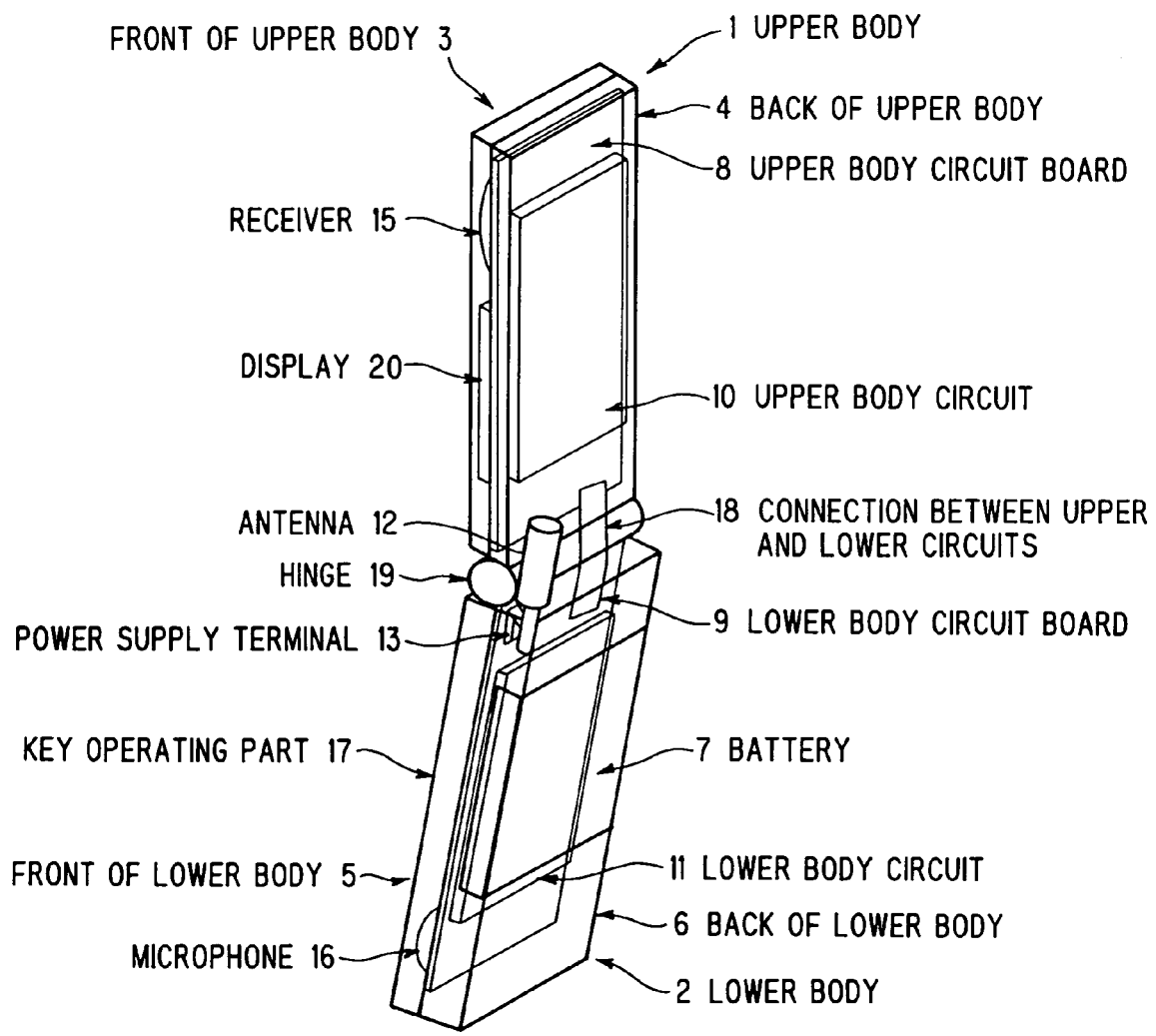
FIG. 5 is a perspective view showing the construction of another conventional folding portable radio communication device.

As shown in FIG. 1, the antenna part 12 in the conventional folding portable radio communication device is disposed in the upper body 1 and is connected through a coaxial cable 25 to the radio part provided in the lower body circuit 11.

On the other hand, in this preferred embodiment, there is no need to provide a coaxial cable for connecting the lower body circuit 11 to the antenna part 12. Specifically, in this preferred embodiment, the antenna part 12 is connected to the lower body circuit 11 through the power supply terminal 13 and an impedance matching circuit (not shown).

Here the impedance matching circuit is a circuit for preventing signal reflection between the antenna part 12 and the lower body circuit 11 and renders input impedance toward the antenna part 12 equal to output impedance from the lower body circuit 11 side including the impedance matching circuit.

At the time of folding of the folding portable radio communication device, when the antenna 12 faces the upper body 1, impedance characteristics of the antenna 12 are often unfavorably influenced. For this reason, in the folding portable radio communication device according to this preferred embodiment, as shown in FIG. 7B, the length of the upper body and the length of the lower body are regulated so that, at the time of folding of the folding portable radio communication device according to this preferred embodiment, the antenna 12 does not face the upper body 1 and the lower body 2, in which the antenna part 12 is mounted, is longer than the upper body 1. According to this construction, at the time of folding of the folding portable radio communication device in this preferred embodiment, the antenna 12 does not face the upper body 1, and this can ensure antenna characteristics of the antenna 12.

When a plate antenna is used as the antenna 12, it is known that, when the antenna 12 faces a gland, the characteristics of the antenna are deteriorated. Therefore, the front part 5 of the lower body should be formed of an insulator such as a mold.

When the front part 5 of the lower body is formed of a metal or other conductive material, a portion around the antenna 12 should be formed of, for example, an insulator to electrically insulate the front part 5 of the lower body and the antenna 12 from each other. For example, when the front part 5 of the lower body is formed of a metal such as a magnesium die cast, the portion of the antenna 12 should be prepared as a separate piece so that the metal does not cover the antenna 12.

When plating or vapor deposition is applied to the front part 5 of the lower body, a mask should be provided in a portion, which faces the antenna 12, so as to avoid the deposition of a conductor such an plating metal. Further, the vapor deposited area should be connected to the lower body circuit board 9 to bring the potential to an identical value.

Figure 8:
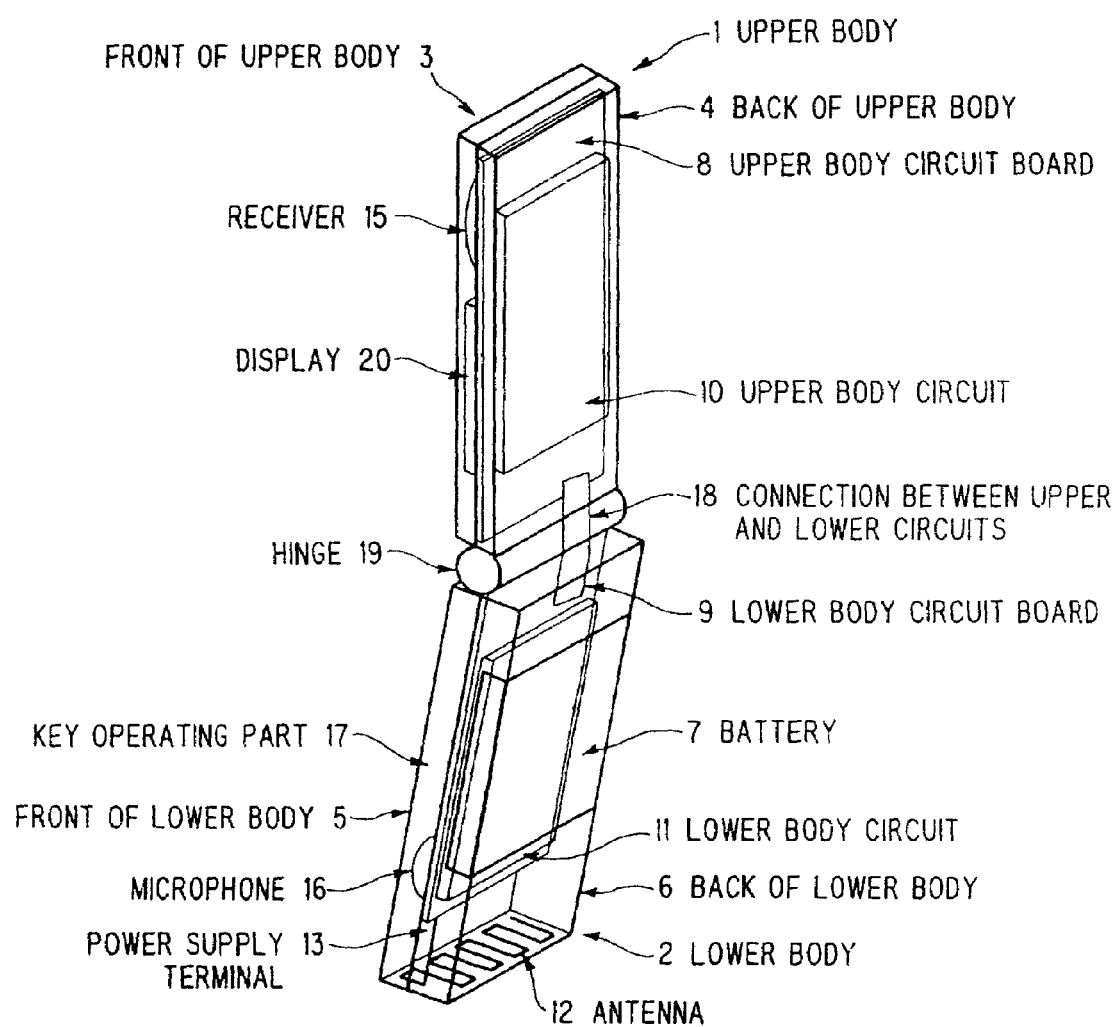
FIG. 8 is a perspective view showing the construction of a folding portable radio communication device according to a second preferred embodiment of the invention.

FIG. 8 is a perspective view showing the construction of the folding portable radio communication device according to the second preferred embodiment of the invention.

In this preferred embodiment, a linear antenna is used as the antenna 12 instead of the plate antenna in the first preferred embodiment.

Specifically, in this preferred embodiment, a linear antenna in a meander form is used instead of the place antenna 12. The structure of the folding portable radio communication device in this preferred embodiment is the same as that of the folding portable radio communication device in the first preferred embodiment of the invention except for the antenna 12.

Figure 9:
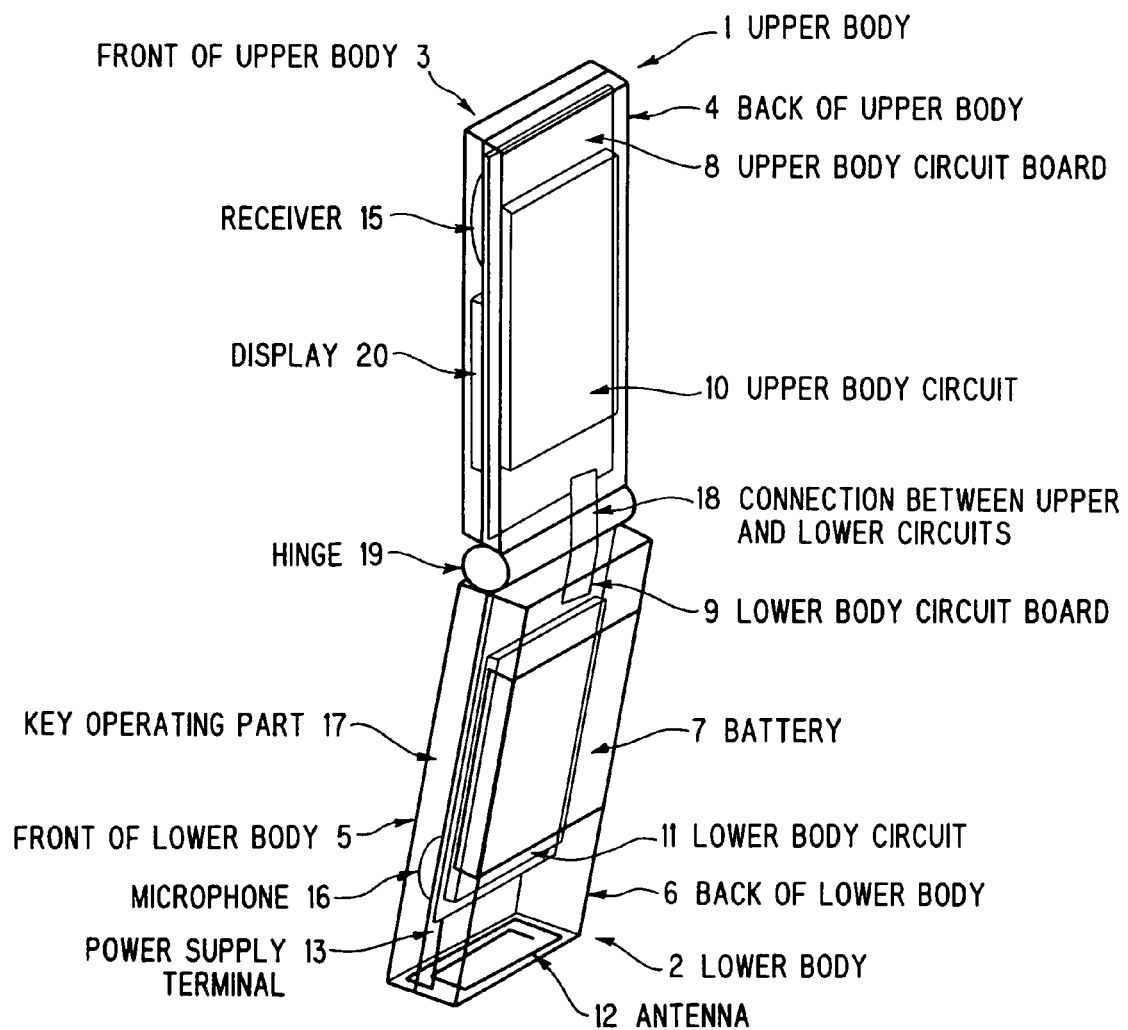
FIG. 9 is a perspective view showing the construction of a folding portable radio communication device according to a third preferred embodiment of the invention.

FIG. 9 is a perspective view showing the construction of the folding portable radio communication device in the third preferred embodiment of the invention.

In the third preferred embodiment, a Hula-Hoop antenna is used instead of the meander antenna as the linear antenna in the second preferred embodiment.

The structure of the folding portable radio communication device in the third preferred embodiment is the same as that of the folding portable radio communication device in the first or second preferred embodiment except for the antenna 12.

Figure 10:
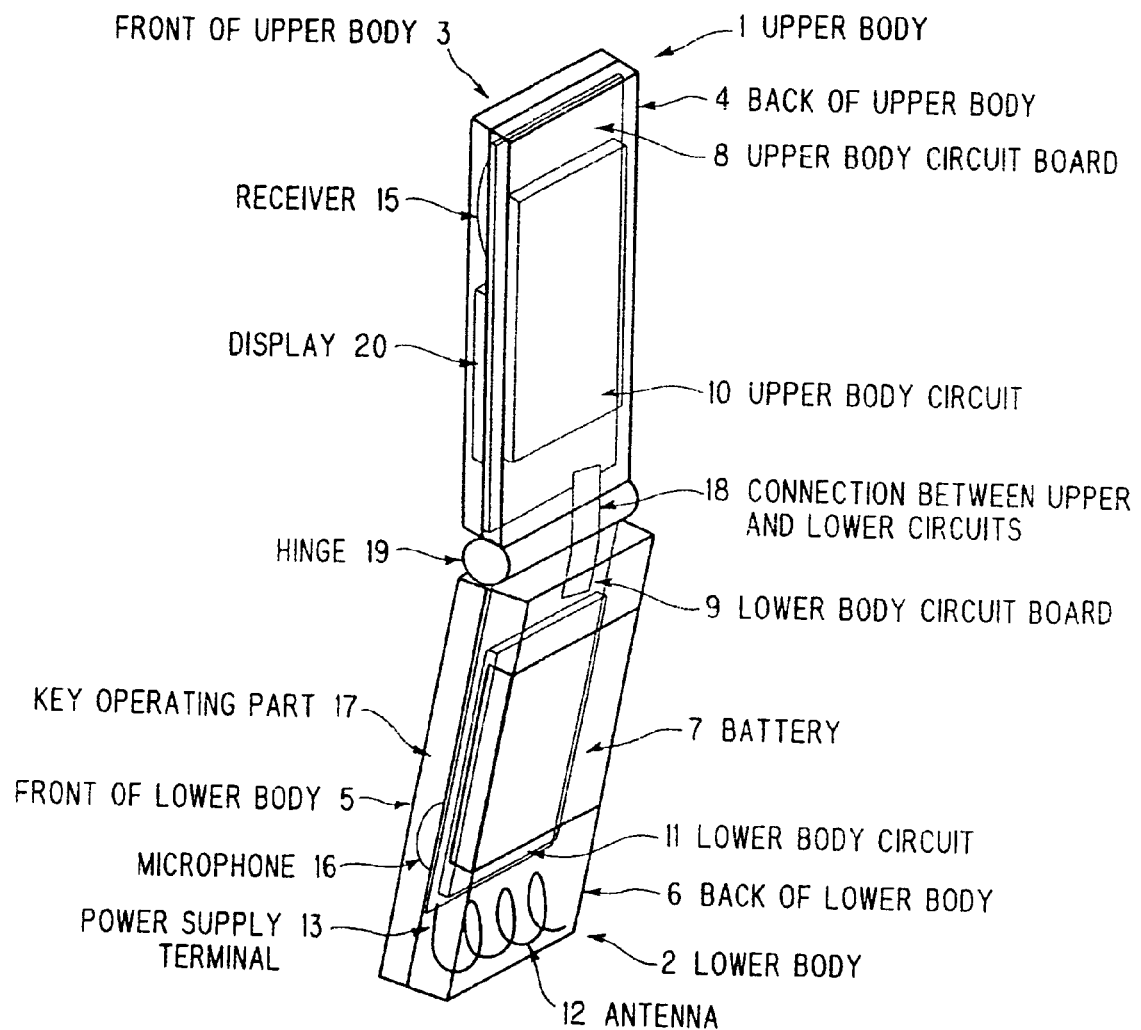
FIG. 10 is a perspective view showing the construction of a folding portable radio communication device according to a fourth preferred embodiment of the invention.

FIG. 10 is a perspective view showing the construction of the folding portable radio communication device in the fourth preferred embodiment of the invention. FIG. 11A is a cross-sectional view of the folding portable radio communication device in an unfolded state in this preferred embodiment, and FIG. 11B is a cross-sectional view of the folding portable radio communication device in a folded state in this preferred embodiment.

In the fourth preferred embodiment, a helical antenna is used instead of the meander antenna and the Hula-Hoop antenna as linear antennas respectively in the second and third preferred embodiments.

The structure of the folding portable radio communication device in the fourth preferred embodiment is the same as that of the folding portable radio communication device in the first, second, or third preferred embodiment of the invention except for the antenna 12.

As described above, in the portable radio communication devices according to the first to fourth preferred embodiments of the invention, the antenna 12 is built in the lower body 2. By virtue of this construction, unlike the conventional folding portable radio communication device as shown in FIG. 1, there is no need to provide a projection of the antenna. This can improve the degree of freedom in design of the folding portable radio communication device and, in addition, can prevent catching of the antenna part during carrying of the folding portable radio communication device.

Further, in the portable radio communication devices according to the first to fourth preferred embodiments of the invention, the need to provide a coaxial cable 25, which has hitherto been used for connecting the radio part within the lower body circuit 11 to the antenna part 12, can be eliminated. This can realize a reduction in the number of necessary components, an improvement in assembly efficiency and the like.

Furthermore, since the antenna 12 is built in the lower body 2, there is no possibility that the antenna 12 touches the user's hand. This can contribute to a reduction in deterioration in antenna characteristics.

As described above, the folding portable radio communication device according to the invention has the following effects.

The first effect is that the necessity of providing a coaxial cable for connecting the lower body circuit in its radio part to the antenna part can be eliminated. This can contribute to simplified structure of folding portable radio communication devices, improved assembly efficiency, and reduced cost.

The second effect is that the elimination of the projection of the antenna part from the backside of the body can enhance the degree of freedom in design, can avoid catching at the time of carrying, and can prevent the concentration of an impact on the antenna at the time of dropping, whereby the breakage of the antenna part can be reduced.

The third effect is that the provision of the antenna at a position close to the microphone in the lower body is less likely to cause catching of the antenna in the user's hand which holds the body. This can reduce the deterioration in antenna characteristics.

The fourth effect is that the provision of the antenna perpendicular to the lower body circuit board within the lower body which houses the battery can satisfactorily ensure the volume of the antenna. This can realize antennas having good characteristics.

The invention has been described in detail with particular reference to preferred embodiments, but it will be understood that variations and modifications can be effected within the scope of the invention as set forth in the appended claims.

What is claimed is:

1. A folding portable radio communication device comprising a plurality of bodies, one or more hinges for connecting the plurality of bodies so as to be mutually swingable, wherein
   a first body in the plurality of bodies houses therein a microphone and a circuit board and, further, mounts therein an antenna part without the projection of the antenna part from the first body,
   the antenna part is built in the first body, and
   the antenna part is mounted in the first body at an end remote from another end of the first body to which a hinge is connected.

2. The folding portable radio communication device according to claim 1, wherein the plurality of bodies are constituted respectively by an upper body, which is located at the upper part when the folding portable radio communication device has been opened, and a lower body which is located at the lower part when the folding portable radio communication device has been opened,
   said first body being the lower body.

3. The folding portable radio communication device according to claim 1, wherein the antenna part is disposed so as to be spread in a direction perpendicular to a direction in which the circuit board mounted within the first body is spread.

4. The folding portable radio communication device according to claim 1, wherein the first body is longer than a second body in said plurality of bodies and, when the folding portable radio communication device has been folded, the first body is projected beyond the second body.

5. The folding portable radio communication device according to claim 1, wherein the antenna part is a plate antenna.

6. The folding portable radio communication device according to claim 1, wherein the antenna part is a linear antenna.

7. The folding portable radio communication device according to claim 6, wherein the antenna part is a meander line antenna.

8. The folding portable radio communication device according to claim 6, wherein the antenna part is a Hula-Hoop antenna.

9. The folding portable radio communication device according to claim 6, wherein the antenna part is a helical antenna.

10. The folding portable radio communication device according to claim 1, wherein
    the first body comprises a front part, which faces another body in said plurality of bodies when the folding portable radio communication device has been folded, and a back part which is put on top of the front part to constitute the first body, and
    the front part is formed of an insulator.

11. The folding portable radio communication device according to claim 1, wherein
    the first body comprises a front part, which faces another body in said plurality of bodies when the folding portable radio communication device has been folded, and a back part which is put on top of the front part to constitute the first body, and
    the front part is formed of a metal and is electrically insulated from the antenna part.

* * * * *